United States Patent Office.

A. T. HYDE, OF ROCHESTER, MINNESOTA.

Letters Patent No. 81,508, dated August 25, 1868.

IMPROVED BITTERS.

*The Schedule referred to in these Letters Patent and making part of the same.*

TO ALL WHOM IT MAY CONCERN:

Be it known that I, A. T. HYDE, of Rochester, in the county of Olmsted, and in the State of Minnesota, have invented certain new and useful Improvements in Compound for Medicinal Bitters; and do hereby declare that the following is a full, clear, and exact description thereof.

My invention consists in the making of a medicinal bitters in the following manner:

Make a fluid extract by triturating the medicines in diluted alcohol or spirits, in the following proportions:

*Alcohol dilutum*, O i.
*Aurantii amari cortex*, ℥ i.
*Gentiana*, ℥ ss.
*Juniperus*, ℥ ii.
*Sassafras radicis cortex*, ℥ i.
*Prunus Virginiana*, ℥ i.
*Myristica*, ℥ ss.
*Xanthoxylum*, ℥ i.
*Cinnamomum*, ℈ i.
*Caryophyllus*, ℈ i.
*Tinct. oleum gaultheria*, f ℥ ss.
*Santalum*, ℥ i.

Then make a sirup as follows:

*Saccharum album*, ℔ iv, which is to dissolve in sufficient hot water to make, *Sirupus*, O viii.

Now mix, of the fluid extract, O i, *Sirupus*, O viii, *Spiritus*, O viii, and the bitters are ready.

These bitters constitute one of the most pleasing and effective tonics ever produced.

I do not wish to confine myself to the proportions of the ingredients herein mentioned.

Having thus fully described my invention, what I claim as new, and desire to secure by Letters Patent, is—

The within-described compound for medicinal bitters, as and for the purposes herein set forth.

In testimony that I claim the foregoing invention, I have hereunto set my hand, this 4th day of January, 1868.

A. T. HYDE.

Witnesses:
 J. V. LAMB,
 A. D. ROBINSON.